US009148215B1

(12) United States Patent
Bonawitz

(10) Patent No.: US 9,148,215 B1
(45) Date of Patent: Sep. 29, 2015

(54) METHOD AND DEVICE FOR DETERMINING COMMUNICATION TIMING

(71) Applicant: Google Inc., Mountain View, CA (US)

(72) Inventor: Keith Allen Bonawitz, Berkeley, CA (US)

(73) Assignee: Google Inc., Mountain View, CA (US)

(*) Notice: Subject to any disclaimer, the term of this patent is extended or adjusted under 35 U.S.C. 154(b) by 89 days.

(21) Appl. No.: 14/097,621

(22) Filed: Dec. 5, 2013

(51) Int. Cl.
G01C 21/12 (2006.01)
H04W 4/00 (2009.01)
H04B 7/185 (2006.01)

(52) U.S. Cl.
CPC ................ H04B 7/18506 (2013.01)

(58) Field of Classification Search
USPC ........................................ 701/445; 455/431
See application file for complete search history.

(56) References Cited

U.S. PATENT DOCUMENTS

| 5,186,418 | A | 2/1993 | Lauritsen | |
|---|---|---|---|---|
| 6,285,318 | B1* | 9/2001 | Schoen et al. | 342/357.37 |
| 6,628,941 | B2* | 9/2003 | Knoblach et al. | 455/431 |
| 7,203,491 | B2 | 4/2007 | Knoblach et al. | |
| 8,781,727 | B1* | 7/2014 | Bonawitz et al. | 701/422 |
| 8,897,770 | B1* | 11/2014 | Frolov et al. | 455/431 |
| 8,918,047 | B1* | 12/2014 | Teller et al. | 455/9 |
| 9,014,957 | B2* | 4/2015 | Bonawitz et al. | 701/120 |
| 2002/0072361 | A1* | 6/2002 | Knoblach et al. | 455/431 |
| 2003/0236070 | A1* | 12/2003 | Seligsohn et al. | 455/12.1 |
| 2005/0014499 | A1* | 1/2005 | Knoblach et al. | 455/431 |
| 2005/0151006 | A1* | 7/2005 | Krill et al. | 244/30 |
| 2007/0010940 | A1* | 1/2007 | Tan et al. | 701/207 |
| 2008/0002190 | A1* | 1/2008 | Romain et al. | 356/139.01 |
| 2010/0172328 | A1* | 7/2010 | McGuffin | 370/332 |
| 2010/0250137 | A1* | 9/2010 | Hoots | 701/301 |
| 2010/0269143 | A1* | 10/2010 | Rabowsky | 725/63 |
| 2011/0178658 | A1* | 7/2011 | Kotaba et al. | 701/3 |
| 2014/0306057 | A1* | 10/2014 | Casse et al. | 244/33 |
| 2015/0061937 | A1* | 3/2015 | Bonawitz et al. | 342/451 |
| 2015/0063159 | A1* | 3/2015 | Bonawitz et al. | 370/254 |

FOREIGN PATENT DOCUMENTS

WO 0029875 5/2000

* cited by examiner

Primary Examiner — Thomas G Black
Assistant Examiner — Tyler Paige
(74) Attorney, Agent, or Firm — McDonnell Boehnen Hulbert & Berghoff LLP

(57) ABSTRACT

This disclosure relates to the use of a method for determining communication timing of an aerial vehicle, such as a balloon. The method includes determining a trajectory of an aerial vehicle. Additionally, the method includes, based on the trajectory, determining a transmission trigger for a location-report message such that a location-report message transmission that is responsive to the transmission trigger has at least a predefined probability of occurring before the aerial vehicle contacts the ground. Further, the method also includes, responsive to the transmission trigger, transmitting the location-report message, where the location-report message comprises location data from the aerial vehicle.

25 Claims, 10 Drawing Sheets

METHOD AND DEVICE FOR DETERMINING COMMUNICATION TIMING

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

At some point in time, an aerial vehicle, such as a high-altitude balloon, that is in the atmosphere may descend, and it may be advantageous to accurately predict where the aerial vehicle will land, e.g., for purposes of recovery. Such a prediction may be determined at a ground station by receiving a communication from the aerial vehicle that indicates the aerial vehicle's current location some time before the aerial vehicle makes landfall.

Ideally, an aerial vehicle will transmit its location upon landing, so that its exact landing location is provided. However, in some cases, where the aerial vehicle lands (e.g., in water or snow), and/or how the aerial vehicle lands (e.g., partially occluded by a boulder or other object) may damage the aerial vehicle's communication systems or otherwise cause a disruption in radio communications between the aerial vehicle and the ground station. Consequently, it may be desirable for the aerial vehicle to transmit a communication that indicates its location immediately before the aerial vehicle lands (or as close as possible to the time it impacts the ground).

In one aspect, the present disclosure features a method for determining communication timing. The method includes determining a trajectory of an aerial vehicle. Additionally, the method includes, based on the trajectory, determining a transmission trigger for a location-report message such that a location-report message transmission that is responsive to the transmission trigger has at least a predefined probability of occurring before the aerial vehicle contacts the ground. Further, the method also includes, responsive to the transmission trigger, transmitting the location-report message, where the location-report message comprises location data from the aerial vehicle.

In another aspect, the present disclosure features an aerial vehicle. The aerial vehicle includes a sensor and a control system configured to determine a trajectory of the aerial vehicle. Further, the control system is configured to, based on the trajectory, determine a transmission trigger for a location-report message such that a location-report message transmission that is responsive to the transmission trigger has at least a predefined probability of occurring before the aerial vehicle contacts the ground. Additionally, the control system is configured to, responsive to the transmission trigger, transmit the location-report message, where the location-report message comprises location data from the aerial vehicle.

In a further aspect, the present disclosure features a method for determining communication timing. The method includes determining a trajectory of an aerial vehicle. The method also includes, based on the trajectory, determining a final transmission trigger for a final location-report message such that a location-report message transmission that is responsive to the final transmission trigger has at least a predefined probability of occurring before the aerial vehicle contacts the ground. Additionally, the method includes, based on the final transmission trigger, determining a transmission schedule for location-report messages, where each location-report message comprises location data from the aerial vehicle. Further, the method includes transmitting the location-report messages according to the transmission schedule. In addition, the method includes, responsive to the final transmission trigger, transmitting the final location-report message.

In an additional aspect, the present disclosure features an aerial vehicle. The aerial vehicle includes a sensor and a control system configured to determine a trajectory of the aerial vehicle. The control system is also configured to, based on the trajectory, determine a final transmission trigger for a final location-report message such that a location-report message transmission that is responsive to the final transmission trigger has at least a predefined probability of occurring before the aerial vehicle contacts the ground. Additionally, the control system is configured to, based on the final transmission trigger, determine a transmission schedule for location-report messages, where each location-report message comprises location data from the aerial vehicle. Further, the control system is configured to transmit the location-report messages according to the transmission schedule. In addition, the control system is configured to, responsive to the final transmission trigger, transmit the final location-report message.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Illustrative embodiments may provide a method for determining communication timing for a location-report message transmitted by an aerial vehicle, such as, for example, a balloon that is part of a mesh network of high-altitude balloons deployed in the stratosphere. The method for determining communication timing may help determine where an aerial vehicle lands, and thereby aid in recovery of the aerial vehicle. This in turn may reduce the cost of implementing, for example, a balloon network that is needed or desired to supplement a cellular network, among other situations. The balloon network can be useful for supplementing the cellular network in various scenarios. For example, the balloon network can be a useful supplement when the cellular network has reached capacity. As another example, the balloon network can be a useful supplement when the cellular network provides insufficient coverage in a given area.

II. Balloon Configuration

Figure 1:
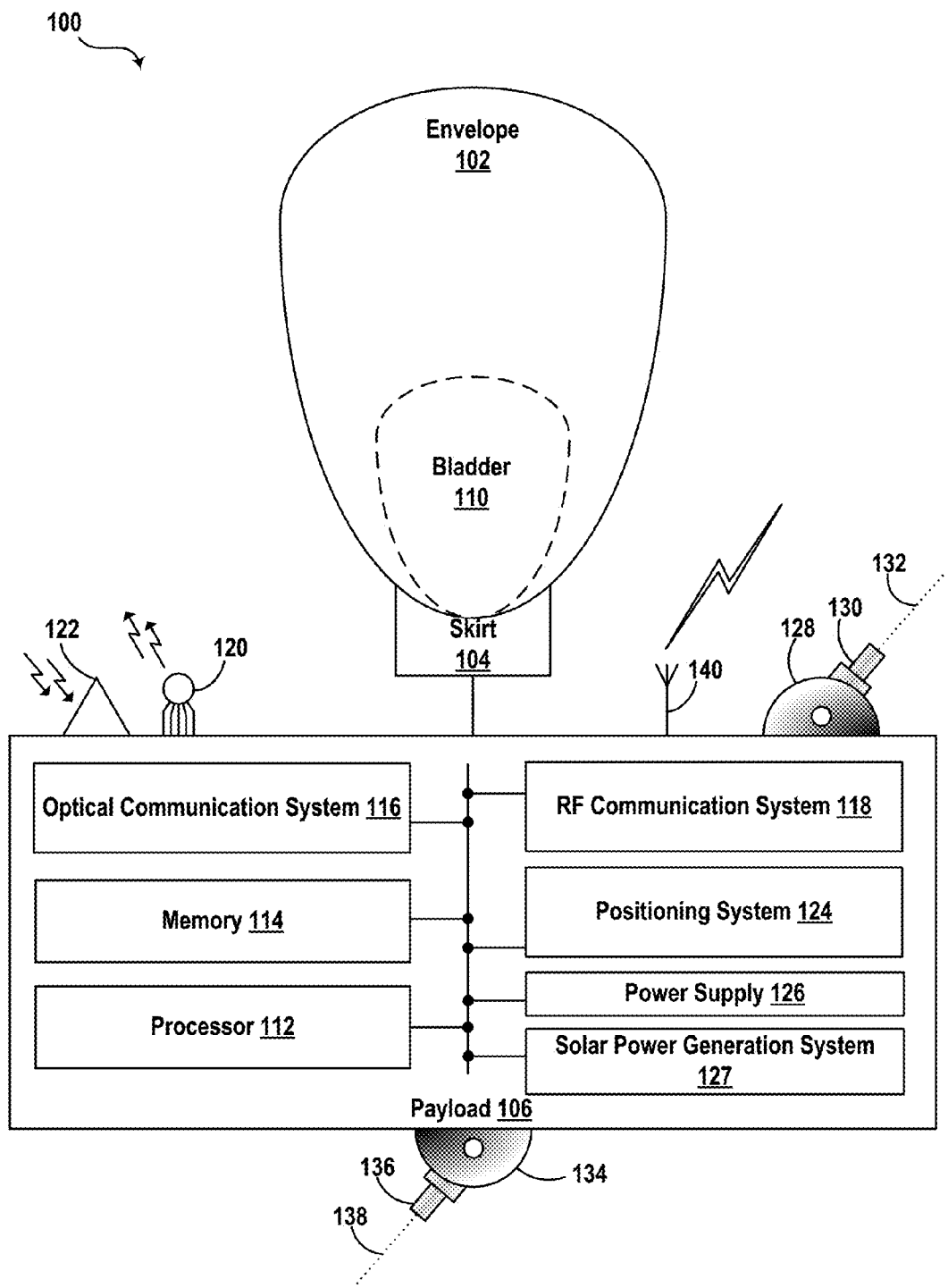
FIG. 1 illustrates a high-altitude balloon, according to an embodiment.

FIG. 1 illustrates a high-altitude balloon 100, according to an embodiment. The balloon 100 includes an envelope 102, a skirt 104, and a payload 106.

The envelope 102 and the skirt 104 can take various forms, which can be currently well-known or yet to be developed. For instance, the envelope 102, the skirt 104, or both can be made of metalized Mylar® or BoPET (biaxially-oriented polyethylene terephthalate). Some or all of the envelope 102, the skirt 104, or both can be constructed from a highly-flexible latex material or a rubber material, such as, for example, chloroprene. These examples are illustrative only; other materials can be used as well. Further, the shape and size of the envelope 102 and the skirt 104 can vary depending upon the particular implementation. Additionally, the envelope 102 can be filled with various different types of gases, such as, for example, helium, hydrogen, or both. These examples are illustrative only; other types of gases can be used as well.

The payload 106 of the balloon 100 includes a processor 112 and memory 114. The memory 114 can be or include a non-transitory computer-readable medium. The non-transitory computer-readable medium can have instructions stored thereon, which can be accessed and executed by the processor 112 in order to carry out some or all of the functions provided in this disclosure.

The payload 106 of the balloon 100 can also include various other types of equipment and systems to provide a number of different functions. For example, the payload 106 includes an optical communication system 116. The optical communication system 116 can transmit optical signals by way of an ultra-bright LED system 120. In addition, the optical communication system 116 can receive optical signals by way of an optical-communication receiver 122, such as, for example, a photo-diode receiver system. Further, the payload 106 can include an RF communication system 118. The RF communication system 118 can transmit and/or receive RF communications by way of an antenna system 140.

In addition, the payload 106 includes a power supply 126. The power supply 126 can be used to provide power to the various components of the balloon 100. The power supply 126 can be or include a rechargeable battery. In some implementations, the power supply 126 can represent another suitable power supply known in the art for producing power. In addition, the balloon 100 includes a solar power generation system 127. The solar power generation system 127 can include solar panels, which can be used to generate power for charging the power supply 126 or for distribution by the power supply 126. In some embodiments, it may be desirable for the balloon system to run off sustainable power. Therefore, all energy used by the balloon system from power supply 126 may be provided from a renewable source, such as solar power generation system 127.

Further, the payload 106 includes various types of sensors 128. The payload 106 can include sensors such as, for example, video or still cameras, a GPS system, motion sensors, accelerometers, gyroscopes, compasses, or sensors for capturing environmental data. These examples are illustrative only; the payload 106 can include various other types of sensors. Further, some or all of the components in the payload 106 can be implemented in a radiosonde, which can be operable to measure various types of information, such as, for example, pressure, altitude, geographical position (latitude and longitude), temperature, relative humidity, wind speed, or direction, among other information.

As noted above, the payload 106 includes an ultra-bright LED system 120. In some implementations, the ultra-bright LED system 120 can be used for free-space optical communication with other balloons. In some implementations, the ultra-bright LED system 120 can be used for free-space optical communication with satellites. In some implementations, the ultra-bright LED system 120 can be used for free-space optical communication both with other balloons and with satellites. To this end, the optical communication system 116 can be configured to transmit a free-space optical signal by causing modulations in the ultra-bright LED system 120. The manner in which the optical communication system 116 is implemented can vary, depending upon the particular application.

In addition, the balloon 100 can be configured for altitude control. For instance, the balloon 100 can include a variable buoyancy system. The buoyancy system can be configured to change the altitude of the balloon 100 by adjusting the volume, the density, or both of the gas in the envelope 102 of the balloon 100. A variable buoyancy system can take various forms, and can generally be any system that can change the volume and/or density of gas in the envelope 102 of the balloon 100.

In an embodiment, a variable buoyancy system can include a bladder 110 that is located inside of the envelope 102. The bladder 110 can be an elastic chamber that is configured to hold liquid and/or gas. Alternatively, the bladder 110 need not be inside the envelope 102. For instance, the bladder 110 can be a rigid bladder that can be pressurized well beyond neutral pressure. The buoyancy of the balloon 100 can therefore be adjusted by changing the density and/or volume of the gas in the bladder 110. To change the density in the bladder 110, the balloon 100 can be configured with systems and/or mechanisms for heating and/or cooling the gas in the bladder 110. Further, to change the volume, the balloon 100 can include pumps or other features for adding gas to and/or removing gas from the bladder 110. To change the volume of the bladder 110, the balloon 100 can include release valves or other features that are controllable to allow gas to escape from the bladder 110. Multiple bladders 110 can be implemented within the scope of this disclosure. For instance, multiple bladders can be used to improve balloon stability.

In an embodiment, the envelope 102 can be filled with helium, hydrogen, or other material that is lighter than air. Thus, the envelope 102 can have an associated upward buoyancy force. In this embodiment, air in the bladder 110 can be considered a ballast tank that can have an associated downward ballast force. In another embodiment, the amount of air in the bladder 110 can be changed by pumping air (for example, with an air compressor) into and out of the bladder 110. By adjusting the amount of air in the bladder 110, the ballast force can be controlled. In some embodiments, the ballast force can be used, in part, to counteract the buoyancy force and/or to provide altitude stability.

In some embodiments, the envelope 102 can be substantially rigid and include an enclosed volume. Air can be evacuated from the envelope 102 while the enclosed volume is substantially maintained. In other words, at least a partial vacuum can be created and maintained within the enclosed volume. Thus, the envelope 102 and the enclosed volume can become lighter than air and provide a buoyancy force. In some embodiments, air or another material can be controllably introduced into the partial vacuum of the enclosed volume by a control unit in an effort to adjust the overall buoyancy force and/or to provide altitude control. Further, the envelope 102 may be coupled to a mass-changing unit, configured to function as the control unit. The mass-changing unit may be configured with an impeller configured to add or remove air from within the envelope 102. Additionally, the mass-changing unit may also include a vent configured to add or remove air from the envelope 102.

In an embodiment, a portion of the envelope 102 can be a first color (for example, black) and/or a first material that is different from another portion or the remainder of the envelope 102. The other portion or the remainder of the envelope can have a second color (for example, white) and/or a second material. For instance, the first color and/or first material can be configured to absorb a relatively larger amount of solar energy than the second color and/or second material. Thus, rotating the balloon such that the first material is facing the sun can act to heat the envelope 102 as well as the gas inside the envelope 102. In this way, the buoyancy force of the envelope 102 can increase. By rotating the balloon such that the second material is facing the sun, the temperature of gas inside the envelope 102 can decrease. Accordingly, the buoyancy force can decrease. In this manner, the buoyancy force of the balloon can be adjusted by changing the temperature/volume of gas inside the envelope 102 using solar energy. In this embodiment, a bladder need not be an element of the balloon 100. Thus, in this embodiment, altitude control of the balloon 100 can be achieved, at least in part, by adjusting the rotation of the balloon 100 with respect to the sun.

Further, the payload 106 of the balloon 100 can include a navigation system (not shown in FIG. 1). The navigation system can implement station-keeping functions to maintain position within and/or move to a position in accordance with a desired topology. In particular, the navigation system can use altitudinal wind data to determine altitudinal adjustments that result in the wind carrying the balloon in a desired direction and/or to a desired location. The altitude-control system can then make adjustments to the density of the balloon chamber in order to effectuate the determined altitudinal adjustments and cause the balloon to move laterally to the desired direction and/or to the desired location.

Alternatively, the altitudinal adjustments can be computed by a ground-based control system and communicated to the high-altitude balloon. As another alternative, the altitudinal adjustments can be computed by a ground-based or satellite-based control system and communicated to the high-altitude balloon. Furthermore, in some embodiments, specific balloons in a heterogeneous balloon network can be configured to compute altitudinal adjustments for other balloons and transmit the adjustment commands to those other balloons.

In such an arrangement, the navigation system can be operable to navigate the balloon to a landing location, in the event the balloon needs to be removed from the network and/or accessed on the ground. Further, a balloon can be self-sustaining so that it does not need to be accessed on the ground. In some embodiments, a balloon can be serviced in-flight by one or more service balloons or by another type of service aerostat or service aircraft.

III. Balloon Networks

Figure 2:
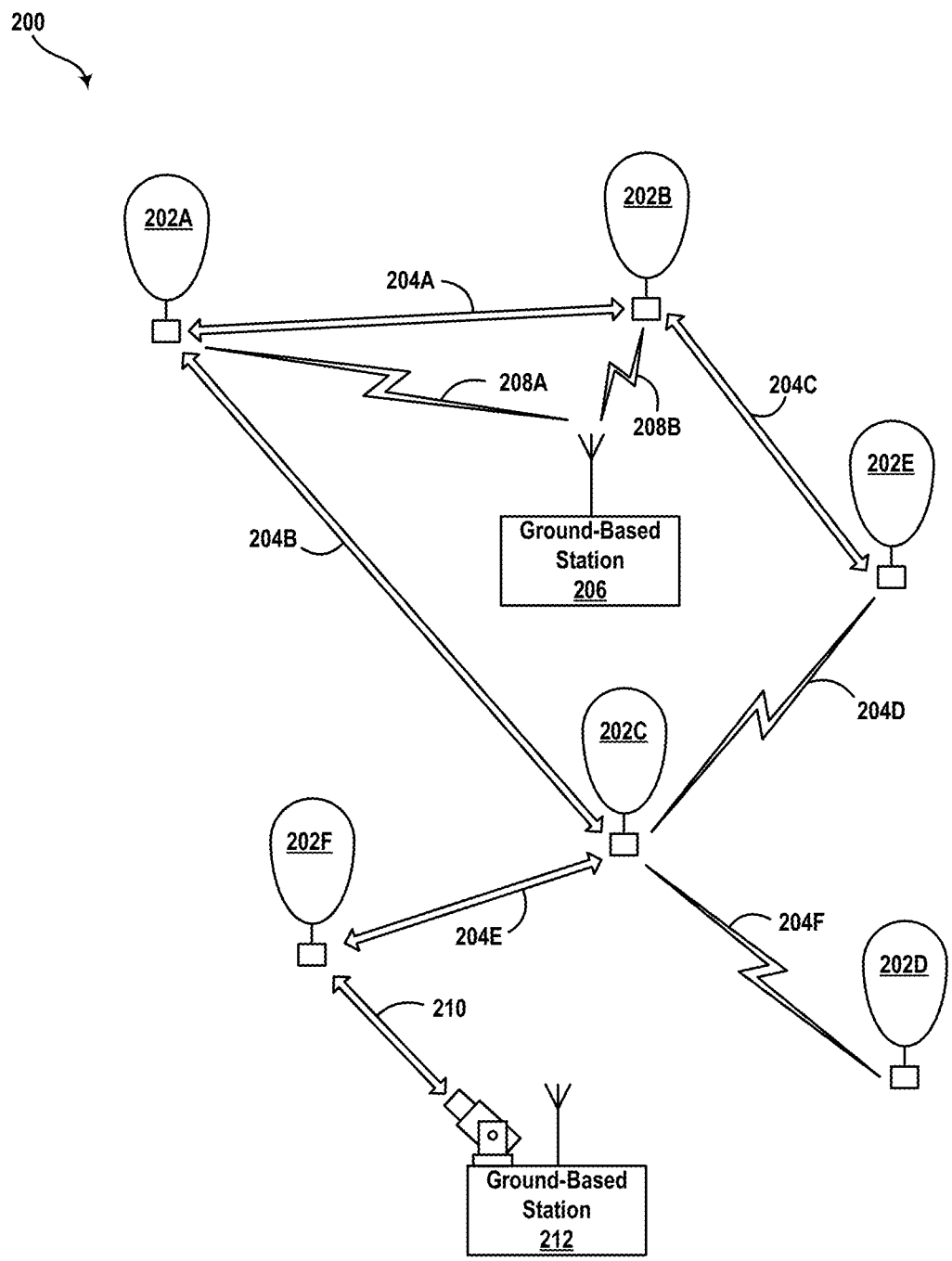
FIG. 2 illustrates a balloon network, according to an embodiment.

FIG. 2 illustrates a balloon network 200, according to an embodiment. The balloon network 200 includes balloons 202A-202F. The balloons 202A-202F are configured to communicate with one another by way of free-space optical links 204A-204F. Configured as such, the balloons 202A to 202F can collectively function as a mesh network for packet-data communications. Further, at least some of the balloons 202A-202F, such as, for example, the balloons 202A and 202B, can be configured for RF communications with a ground-based station 206 by way of respective RF links 208A and 208B. The ground-based station 206 represents one or more ground-based stations. In addition, some of the balloons 202A-202F, such as, for example, the balloon 202F, can be configured to communicate by way of an optical link 210 with a ground-based station 212. The ground-based station 212 represents one or more ground-based stations.

In an embodiment, the balloons 202A-202F are high-altitude balloons, which can be deployed in the stratosphere. At moderate latitudes, the stratosphere includes altitudes between approximately 10 kilometers (km) and 50 km above the Earth's surface. At the poles, the stratosphere starts at an altitude of approximately 8 km. In an embodiment, high-altitude balloons can be configured to operate in an altitude range within the stratosphere that has relatively low wind-speeds, such as, for example, between 5 and 20 miles per hour (mph).

In the high-altitude-balloon network 200, the balloons 202A-202F can be configured to operate at altitudes between 18 km and 25 km. In some implementations, the balloons 202A-202F can be configured to operate at other altitudes. The altitude range of 18 km-25 km can be advantageous for several reasons. In particular, this layer of the stratosphere generally has relatively low wind speeds (for example, winds between 5 and 20 mph) and relatively little turbulence. Further, while the winds in this altitude range can vary with latitude and by season, the variations can be modeled in a reasonably accurate manner. In addition, altitudes above 18 km are typically above the maximum flight level designated for commercial air traffic. Therefore, interference with commercial flights is not a significant concern when balloons are deployed between 18 km and 25 km.

To transmit data to another balloon, a given balloon 202A-202F can be configured to transmit an optical signal by way of a corresponding optical link 204A-204F. In an embodiment, some or all of the balloons 202A-202F can use one or more high-power light-emitting diodes (LEDs) to transmit an optical signal. Alternatively, some or all of the balloons 202A-202F can include laser systems for free-space optical communications over corresponding optical links 204A-204F. Other types of free-space optical communication are possible. Further, in order to receive an optical signal from another balloon by way of an optical link, a given balloon 202A-202F can include one or more optical receivers, as discussed above in connection with FIG. 1.

The balloons 202A-202F can utilize one or more of various different RF air-interface protocols for communication with ground-based stations, such as, for example, the ground-based station 206. For instance, some or all of the balloons 202A-202F can be configured to communicate with the ground-based station 206 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

There can be scenarios where the RF links 208A-208B do not provide a desired link capacity for balloon-ground communications. For instance, increased capacity can be desirable to provide backhaul links from a ground-based gateway. Accordingly, a balloon network can also include downlink balloons, which can provide a high-capacity air-ground link.

For example, in the balloon network 200, the balloon 202F is configured as a downlink balloon. Like other balloons in the balloon network 200, the downlink balloon 202F can be operable for optical communication with other balloons by way of corresponding optical links 204A-204F. The downlink balloon 202F can also be configured for free-space optical communication with the ground-based station 212 by way of the optical link 210. The optical link 210 can therefore serve as a high-capacity link (as compared to the RF links 208A-208B) between the balloon network 200 and the ground-based station 212.

Note that in some implementations, the downlink balloon 202F can be operable for RF communication with the ground-based stations 206. In other implementations, the downlink balloon 202F may only use the optical link 210 for balloon-to-ground communications. Further, while the arrangement shown in FIG. 2 includes one downlink balloon 202F, a balloon network can also include multiple downlink balloons. In addition, a balloon network can be implemented without the use of any downlink balloons.

In some implementations, a downlink balloon can be equipped with a specialized, high-bandwidth RF communication system for balloon-to-ground communications, instead of, or in addition to, a free-space optical communication system. The high-bandwidth RF communication system can take the form of an ultra-wideband system, which can provide an RF link with substantially the same capacity as one of the optical links 204A-204F.

Ground-based stations, such as the ground-based stations 206 and 212, can take various forms. Generally, a ground-based station includes components such as transceivers, transmitters, and receivers for communication with a balloon network by way of RF links, optical links, or both. Further, a ground-based station can use various air-interface protocols in order to communicate with one or more of the balloons 202A-202F by way of an RF link. As such, a ground-based station 206 can be configured as an access point by which various devices can connect to the balloon network 200. The ground-based station 206 can have other configurations and can serve other purposes without departing from the scope of this disclosure.

Some or all of the balloons 202A-202F can be configured to establish a communication link with space-based satellites by way of corresponding communication links. The balloons can establish the communication links with the space-based satellites in addition to, or as an alternative to, the ground-based communication links. In addition, the balloons can be configured to communicate with the space-based satellites using any suitable protocol. In some implementations, one or more of the communication links can be optical links. Accordingly, one or more of the balloons can communicate with the satellites by way of free-space optical communication. Other balloon-satellite communication links and techniques can be used.

Further, some ground-based stations, such as, for example, the ground-based station 206, can be configured as gateways between the balloon network 200 and another network. For example, the ground-based station 206 can serve as an interface between the balloon network 200 and the Internet, a cellular service provider's network, or another network.

A. Mesh-Network Functionality

As noted above, the balloons 202A-202F can collectively function as a mesh network. More specifically, because the balloons 202A-202F can communicate with one another using free-space optical links, the balloons can collectively function as a free-space optical mesh network.

In a mesh-network configuration, each of the balloons 202A-202F can function as a node of the mesh network. The mesh network can be operable to receive data directed to it and to route data to other balloons. As such, data can be routed from a source balloon to a destination balloon by determining an appropriate sequence of optical links between the source balloon and the destination balloon. This disclosure may refer to these optical links, collectively, as a "lightpath" for the connection between the source and destination balloons. Further, this disclosure may refer to each of the optical links as a "hop" along the lightpath.

To operate as a mesh network, the balloons 202A-202F can employ various routing techniques and self-healing algorithms. In some implementations, the balloon network 200 can employ adaptive or dynamic routing, in which a lightpath between a source balloon and a destination balloon is determined and set-up when the connection is needed, and is released at a later time. Further, when adaptive routing is used, the lightpath can be determined dynamically, depending upon the current state, past state, and/or predicted state of the balloon network.

In addition, the network topology can change as the balloons 202A-202F move relative to one another and/or relative to the ground. Accordingly, the balloon network 200 can apply a mesh protocol to update the state of the network as the topology of the network changes. For example, to address the mobility of the balloons 202A-202F, the balloon network 200 can employ and/or adapt various techniques that are employed in mobile ad hoc networks (MANETs).

In some implementations, the balloon network 200 can be configured as a transparent mesh network. In a transparent balloon network, the balloons can include components for physical switching in a way that is entirely optical, without involving a substantial number of, or any, electrical components in the physical routing of optical signals. Accordingly, in a transparent configuration with optical switching, signals can travel through a multi-hop lightpath that is entirely optical.

In other implementations, the balloon network 200 can implement a free-space optical mesh network that is opaque. In an opaque configuration, some or all of the balloons 202A-202F can implement optical-electrical-optical (OEO) switching. For example, some or all of the balloons 202A-202F can include optical cross-connects (OXCs) for OEO conversion of optical signals. This example is illustrative only; other opaque configurations can be used.

The balloons 202A-202F in the balloon network 200 can utilize techniques such as wavelength division multiplexing (WDM) in order to increase link capacity. When WDM is implemented with transparent switching, physical lightpaths through the balloon network can be subject to the wavelength continuity constraint. In particular, because switching in a transparent network is entirely optical, it can be necessary, in some instances, to assign the same wavelength to all optical links along a given lightpath.

An opaque configuration can be used to avoid the wavelength continuity constraint. In particular, balloons in an opaque balloon network can include OEO switching systems operable for wavelength conversion. As a result, balloons can convert the wavelength of an optical signal at corresponding hops along a lightpath.

Further, various routing algorithms can be employed in an opaque configuration. For example, to determine a primary lightpath and/or one or more diverse backup lightpaths for a given connection, a balloon can apply shortest-path routing techniques, such as, for example, Dijkstra's algorithm and k-shortest path. In addition, a balloon can apply edge and node-diverse or disjoint routing, such as, for example, Suurballe's algorithm. Further, a technique for maintaining a particular quality of service (QoS) can be employed when determining a lightpath.

B. Station-Keeping Functionality

In an embodiment, a balloon network 100 can implement station-keeping functions to help provide a desired network topology. For example, station-keeping can involve each of the balloons 202A-202F maintaining a position or moving to a position relative to one or more other balloons in the network 200. The station-keeping can also, or instead, involve each of the balloons 202A-202F maintaining a position or moving to a position relative to the ground. Each of the balloons 202A-202F can implement station-keeping functions to determine the given balloon's desired positioning in the desired topology, and if desirable, to determine how the given balloon is to move to the desired position.

The network topology can vary depending on the desired implementation. In an implementation, the balloons 202A-202F can implement station-keeping such that the balloon network 200 has a substantially uniform topology. For example, a given balloon can implement station-keeping functions to position itself at substantially the same distance (or within a certain range of distances) from adjacent balloons in the balloon network. In another implementation, the balloons 202A-202F can implement station-keeping such that the balloon network 200 has a substantially non-uniform topology. This implementation can be useful when there is a need for balloons to be distributed more densely in some areas than in others. For example, to help meet higher bandwidth demands that are typical in urban areas, balloons can be clustered more densely over urban areas than in other areas. For similar reasons, the distribution of balloons can be denser over land than over large bodies of water. These examples are illustrative only; non-uniform topologies can be used in other settings.

In addition, the topology of a balloon network can be adaptable. In particular, balloons can utilize station-keeping functionality to allow the balloons to adjust their respective positioning in accordance with a change in the topology of the network. For example, several balloons can move to new positions in order to change a balloon density in a given area.

In an implementation, the balloon network 200 can employ an energy function to determine whether balloons should move in order to provide a desired topology. In addition, the energy function can indicate how the balloons should move in order to provide the desired topology. In particular, a state of a given balloon and states of some or all nearby balloons can be used as inputs to an energy function. The energy function can apply the states to a desired network state, which can be a state corresponding to the desired topology. A vector indicating a desired movement of the given balloon can then be determined by determining a gradient of the energy function. The given balloon can then determine appropriate actions to take in order to effectuate the desired movement. For example, a balloon can determine an altitude adjustment or adjustments such that winds will move the balloon in the desired manner.

C. Control of Balloons in a Balloon Network

Figure 3:
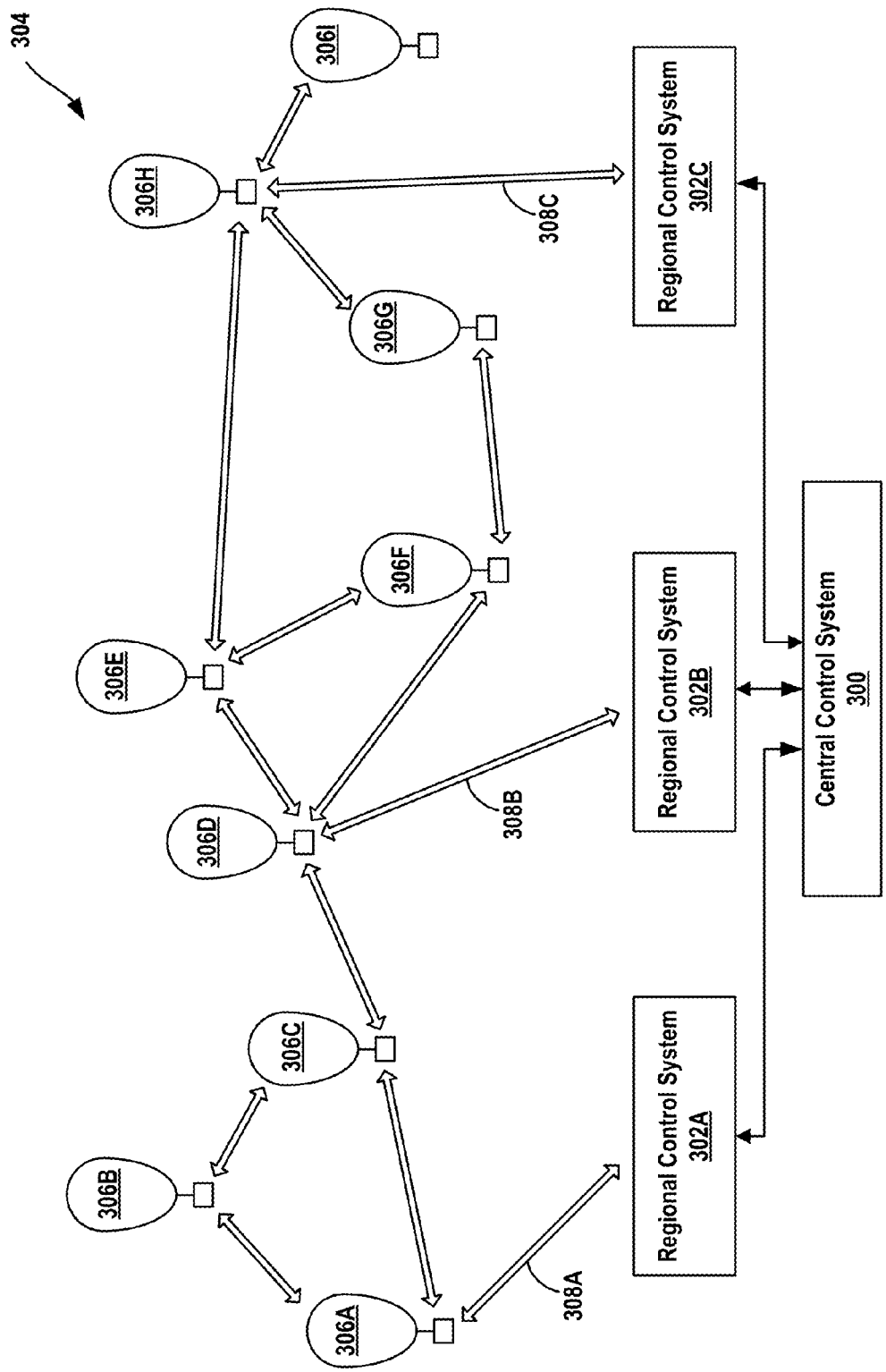
FIG. 3 illustrates a centralized system for controlling a balloon network, according to an embodiment.

Mesh networking, station-keeping functions, or both can be centralized. For example, FIG. 3 illustrates a centralized system for controlling a balloon network 304. In particular, a central control system 300 is in communication with regional control-systems 302A-302C. The central control system 300 can be configured to coordinate functionality of the balloon network 304. To this end, the central control system 300 can control functions of balloons 306A to 306I.

The central control system 300 can communicate with the balloons 306A-306I by way of the regional control systems 302A-302C. Each of the regional control systems 302A-302C can be a ground-based station, such as, for example, the ground-based station 206 discussed above in connection with FIG. 2. Each of the regional control systems 302A-302C can cover a different geographic area. The geographic areas can overlap or be separate. Each of the regional control systems 302A-302C can receive communications from balloons in the respective regional control system's area. In addition, each of the regional control systems 302A-302C can aggregate data from balloons in the respective regional control system's area. The regional control systems 302A-302C can send information they receive to the central control system 300. Further, the regional control systems 302A-302C can route communications from the central control system 300 to the balloons 306A-306I in their respective geographic areas. For instance, the regional control system 302A can relay communications between the balloons 306A-306C and the central control system 300. Likewise, the regional control system 302B can relay communications between the balloons 306D-306F and the central control system 300. Likewise, the regional control system 302C can relay communications between the balloons 306G-306I and the central control system 300.

To facilitate communications between the central control system 300 and the balloons 306A-306I, some of the balloons 306A-306I can serve as downlink balloons. The downlink balloons can communicate with the regional control systems 302A-302C. Accordingly, each of the regional control systems 302A-302C can communicate with a downlink balloon in the geographic area that the regional control system covers. In the balloon network 304, the balloons 306A, 306D, and 306H serve as downlink balloons. The regional control system 302A can communicate with the downlink balloon 306A by way of communication link 308A. Likewise, the regional control system 302B can communicate with the downlink balloon 306D by way of communication link 308B. Likewise, the regional control system 302C can communicate with the balloon 306H by way of communication link 308C. The communication links 308A-308C can be optical links or RF links, depending on the desired implementation.

In the balloon network 304, three of the balloons serve as downlink balloons. In an implementation, all of the balloons in a balloon network can serve as downlink balloons. In another implementation, fewer than three balloons or more than three balloons in a balloon network can serve as downlink balloons.

The central control system 300 can coordinate mesh-networking functions of the balloon network 304. For example, the balloons 306A-306I can send the central control system 300 state information. The central control system 300 can utilize the state information to determine the state of the balloon network 304. State information from a given balloon can include data such as, for example, location data identifying the relative or absolute location of the balloon. In addition, the state information from the given balloon can include data representing wind speeds near the balloon. In addition, the state information from the given balloon can include information about an optical link that the balloon has established. For example, the information about the optical link can include the identity of other balloons with which the balloon has established an optical link, the bandwidth of the optical link, wavelength usage, or availability on an optical link. Accordingly, the central control system 300 can aggregate state information from some or all of the balloons 306A-306I in order to determine an overall state of the balloon network 304.

The overall state of the balloon network 304 can be used to coordinate mesh-networking functions, such as, for example, determining lightpaths for connections. For example, the central control system 300 can determine a current topology based on the aggregate state information from some or all of the balloons 306A-306I. The topology can indicate which optical links are available in the balloon network 304. In addition, the topology can indicate which wavelengths are available for use with the links. The central control system 300 can send the topology to some or all of the balloons 306A-306I so that a routing technique can be employed to select appropriate lightpaths (and possibly backup lightpaths) for communications that use the balloon network 304.

In addition, the central control system 300 can coordinate station-keeping functions of the balloon network 304. For example, the central control system 300 can receive state information from the balloons 306A-306I, as discussed above, and can use the state information as an input to an energy function. The energy function can compare the current topology of the network to a desired topology and, based on the comparison, provide a vector indicating a direction of movement (if any) of each balloon. Further, the central control system 300 can use altitudinal wind data to determine respective altitude adjustments that can be initiated in order to achieve the movement towards the desired topology.

Accordingly, the arrangement shown in FIG. 3 provides for coordinating communications between the central control system 300 and the balloon network 304. This arrangement can be useful to provide centralized control for a balloon network that covers a large geographic area. When expanded, this arrangement can support a global balloon network, which can provide global coverage.

This disclosure contemplates arrangements other than the arrangement shown in FIG. 3. For example, an arrangement can include a centralized control system, regional control systems, and sub-region systems. The sub-region systems can serve to provide communications between the centralized control system and the corresponding regional control systems. As another example, control functions of a balloon network can be provided by a single, centralized, control system. The control system can communicate directly with one or more downlink balloons.

The central control system 300 and the regional control systems 302A-302C need not control and coordinate all of the functions of the balloon network 304. In an implementation, a ground-based control system and a balloon network can share control and coordination of the balloon network. In another implementation, the balloon network itself can control and coordinate all of the functions of the balloon network. Accordingly, in this implementation, the balloon network can be controlled without a need for ground-based control. To this end, certain balloons can be configured to provide the same or similar functions as those discussed above in connection with the central control system 300 and the regional control systems 302A-302C.

In addition, control of a balloon network, coordination of the balloon network, or both can be de-centralized. For example, each balloon in a balloon network can exchange state information with nearby balloons. When the balloons exchange state information in this way, each balloon can individually determine the state of the network. As another example, certain balloons in a balloon network can serve as aggregator balloons. The aggregator balloons can aggregate state information for a given portion of the balloon network. The aggregator balloons can coordinate with one another to determine the overall state of the network.

IV. Methods for Determining Communication Timing

Figure 4A:
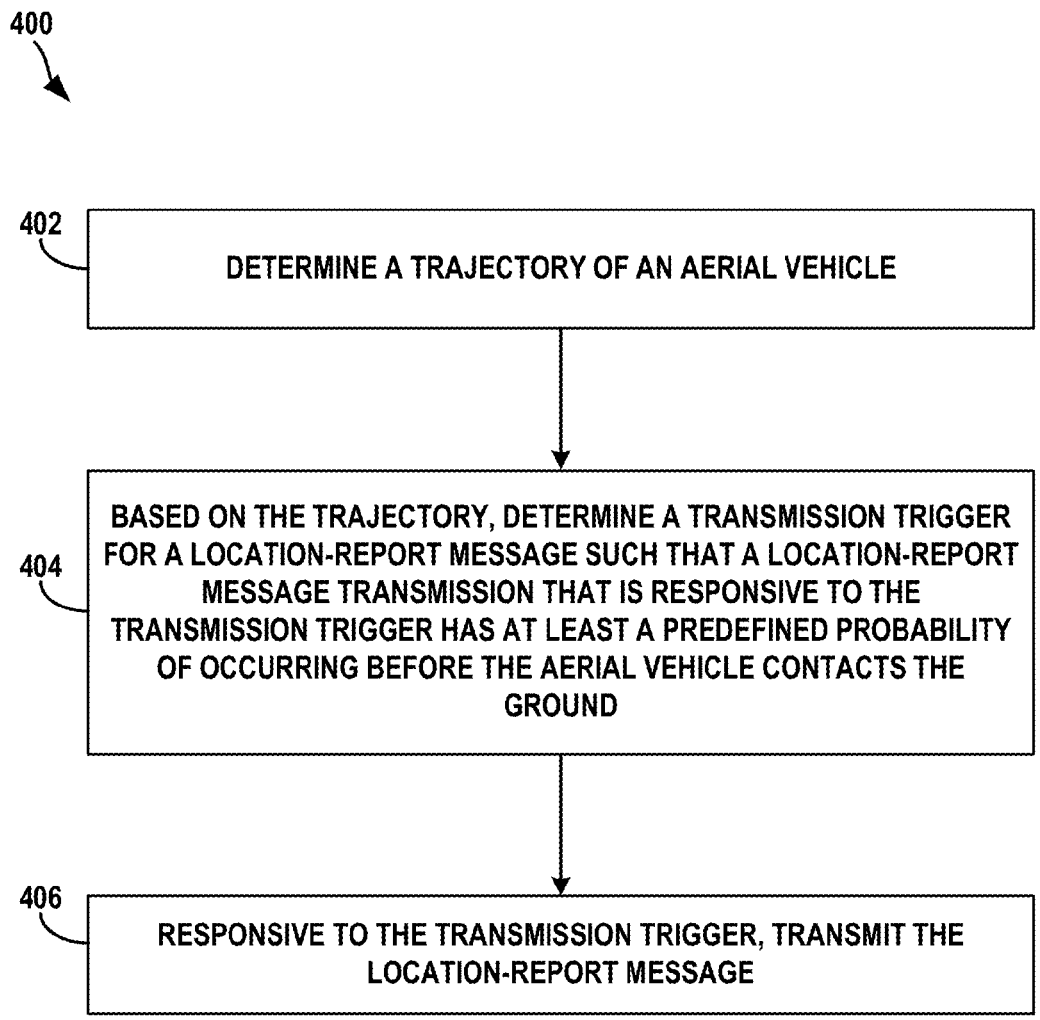
FIG. 4A illustrates a method for determining communication timing, according to an embodiment.
Figure 5A:
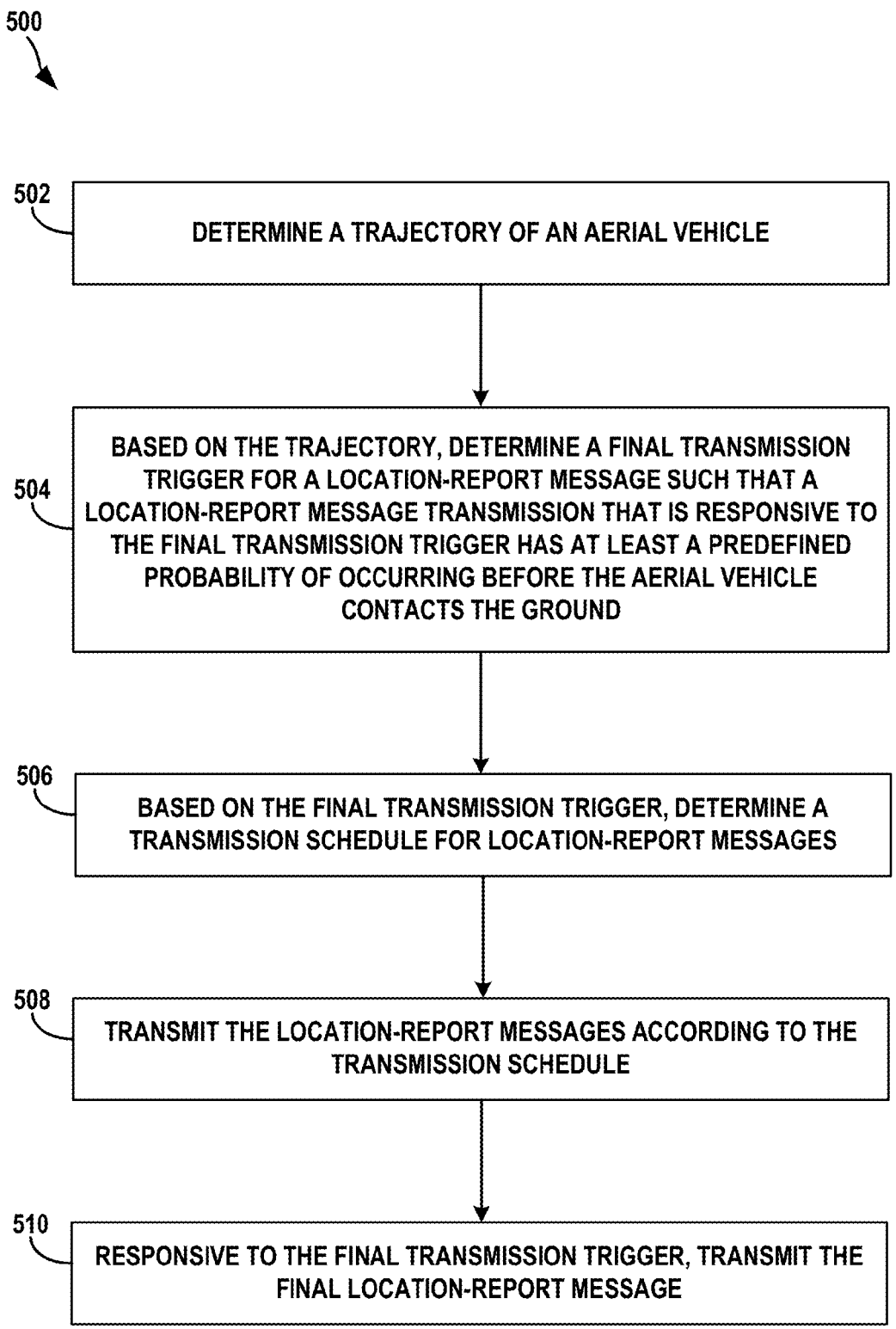
FIG. 5A illustrates a method for determining communication timing, according to an embodiment.

Example methods, such as method 400 of FIG. 4A and method 500 of FIG. 5A, may be carried out by a control system and/or by other components of an aerial vehicle, for example, the high-altitude balloon 100. A control system may take the form of program instructions stored on a non-transitory computer readable medium (e.g., memory 114 of FIG. 1) and a processor that executes the instructions (e.g., processor 112). However, a control system may take other forms including software, hardware, and/or firmware.

a. Example Method 400

FIG. 4A illustrates a method 400 for determining communication timing of an aerial vehicle, such as the high-altitude balloon 100. The method 400 may begin at block 402 with determining a trajectory of an aerial vehicle. At block 404, the method 400 may involve, based on the trajectory, determining a transmission trigger for a location-report message such that a location-report message transmission that is responsive to the transmission trigger has at least a predefined probability of occurring before the aerial vehicle contacts the ground. At block 406, the method 400 may involve, responsive to the transmission trigger, transmitting the location-report message, where the location-report message includes location data from the aerial vehicle. Each of the blocks shown with respect to FIG. 4A is discussed further below.

1. Determining Trajectory

The example method 400 may begin at block 402 with determining a trajectory of an aerial vehicle. As described above, the aerial vehicle may be the balloon 100.

In some embodiments, determining the trajectory of the aerial vehicle may involve estimating an expected trajectory. The expected trajectory may be a function of one or more of the aerial vehicle's: current altitude, current descent speed, mass, cross-sectional area, and drag coefficient, which may be affected by a parachute of the vehicle. Additionally, the expected trajectory may be a function of the temperature and/or the pressure of the surrounding atmosphere. Accordingly, the aerial vehicle may be equipped with any necessary sensors and/or equipment to make any such measurements, e.g., as discussed above with reference to FIG. 1. For example, the aerial vehicle may be equipped with a sensor configured to detect GPS signals or determine a barometric altitude above sea level, among other examples.

In one embodiment, determining the trajectory of the aerial vehicle may involve determining a descent mode of the aerial vehicle. The control system of the aerial vehicle may be configured to detect the descent mode.

The aerial vehicle may be in one of several possible descent modes. Some examples may include a burst descent, a venting descent, a gradual descent, and a parachuted descent, among other example descent modes. In the burst descent, an envelope of the aerial vehicle (e.g., the envelope 102) may rupture and cause the aerial vehicle to descend without any lift gas in the envelope. In the venting descent, the aerial vehicle may descend by intermittently or periodically venting gas from the aerial vehicle. In the gradual descent, the aerial vehicle may descend via a gradual and/or continuous release of gas from the aerial vehicle. In the parachuted descent, the aerial vehicle may release all or a portion of gas from the aerial vehicle and descend with a deployed parachute. Other descent modes are certainly possible.

In some embodiments, determining the trajectory may be based on the aerial vehicle transitioning between descent modes. The aerial vehicle may begin descending in one mode and then transition to a second mode. For example, the aerial vehicle may begin to descend in the gradual descent mode, and then, at some time before contacting the ground, transition to descend in the burst mode. Other examples are also possible.

In an embodiment, the determined trajectory may include trajectory data regarding the descent of the aerial vehicle. In some instances, the trajectory data may indicate a descent path that the aerial vehicle is expected to take, a time at which the aerial vehicle is expected to contact the ground, and/or a location where the aerial vehicle is expected to contact the ground. The trajectory data may include other information as well. The control system may store the trajectory data in memory.

2. Determining Transmission Trigger

At block 404, the method 400 may involve, based on the trajectory, determining a transmission trigger for a location-report message such that a location-report message transmission that is responsive to the transmission trigger has at least a predefined probability of occurring before the aerial vehicle contacts the ground.

In some embodiments, determining the transmission trigger may involve estimating or otherwise predicting when and/or where the aerial vehicle is expected to contact the ground in the future based on the determined trajectory. From such an estimate, the transmission trigger may be determined such that if a hypothetical message was transmitted according to the transmission trigger, there would be at least a predefined probability that the hypothetical message would transmit before the aerial vehicle contacts the ground. That is, in some embodiments, the location-report message transmission may or may not occur, but may nonetheless be used to determine the transmission trigger. Because the location-report message transmission may occur, it may be referred herein as an expected location-report message transmission or simply an expected message transmission.

In some embodiments, determining the transmission trigger may be an iterative or recursive process. Further, determining the transmission trigger may be a dynamic process. For example, the transmission trigger may be continually determined and updated as the aerial vehicle approaches the ground.

In some embodiments, determining the transmission trigger may be additionally based on an altitude profile of the ground. In certain instances, the altitude profile of the ground may be known or computed. In example embodiments, the altitude profile of the ground may be measured in meters above sea level. Other units of measurement may also be used.

In general, a transmission trigger may be any event that, when detected or otherwise determined to have occurred, may cause the aerial vehicle to attempt to transmit a location-report message to a ground station. In some embodiments, the transmission trigger may include a transmission altitude that corresponds to an altitude at which the aerial vehicle may attempt to transmit the location-report message. As such, in response to determining the transmission trigger, the control system may store in memory transmission altitude data that indicates an altitude where the aerial vehicle may attempt to transmit the location-report message. In one embodiment, the transmission altitude data may indicate GPS coordinates or a barometric altitude reading.

In other embodiments, the transmission trigger may include a transmission time that corresponds to a time at which the aerial vehicle may attempt to transmit the location-report message. As such, in response to determining the transmission trigger, the control system may store in memory transmission time data that indicates a time when the aerial vehicle may attempt to transmit the location-report message. In one embodiment, the transmission time may be a wall-clock time (e.g., a Coordinated Universal Time ("UTC")) or a specified duration of time after which a location-report message transmission may be attempted. Other examples are also possible.

The location-report message may include location data of the aerial vehicle. In some embodiments, the location data may indicate current GPS coordinates and/or current barometric altitude data. Other examples of location data types are also possible.

The predefined probability may be a probability between about 85% and 100%. For example, the transmission trigger may be determined such that if the aerial vehicle attempted a location-report message transmission in accordance with the transmission trigger, there is a 95% likelihood that the location-report message would be transmitted before the aerial vehicle contacts the ground. Other example predefined probabilities are also possible.

Figure 4B:
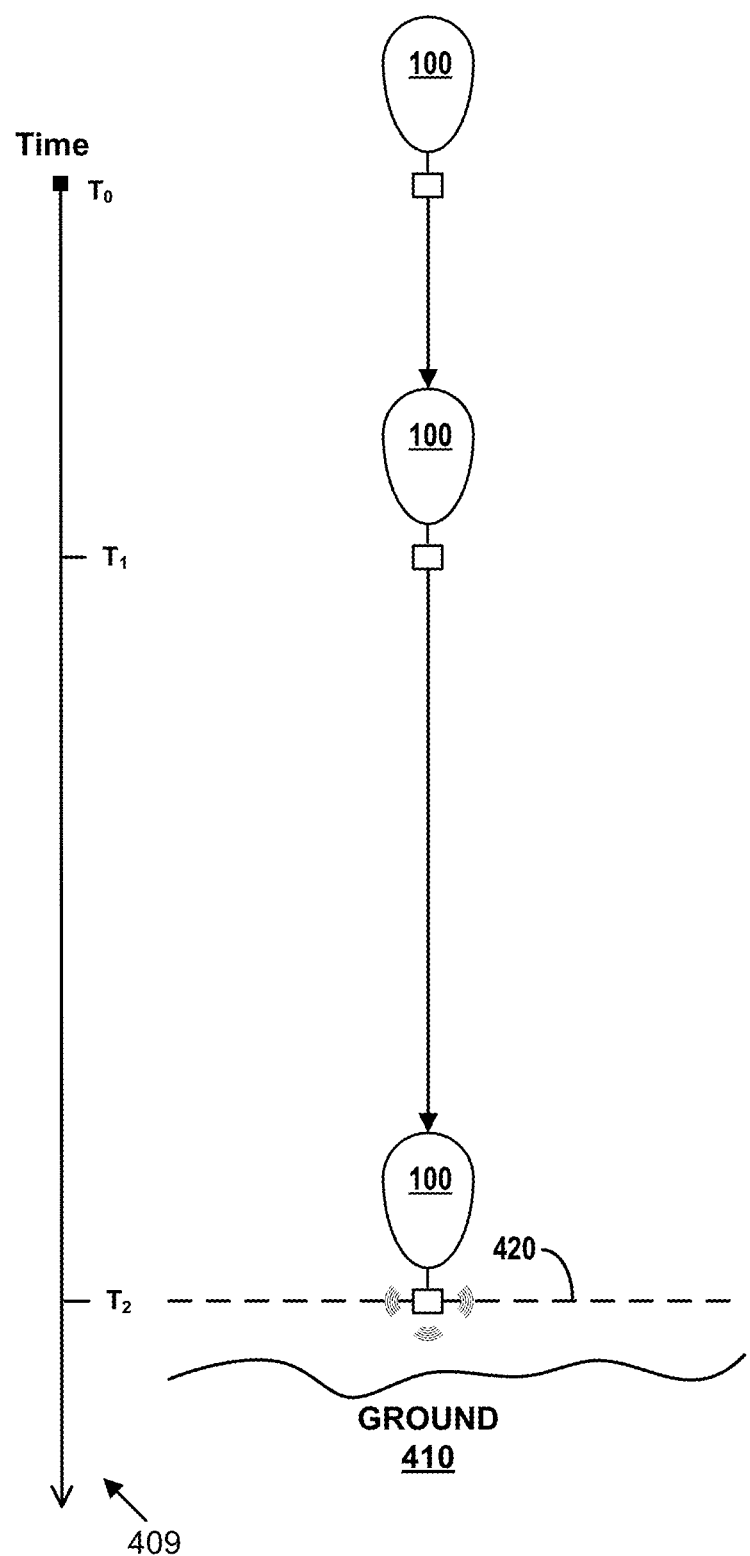
FIG. 4B illustrates an aerial vehicle at various points in time, according to an embodiment.

Referring now to FIG. 4B. FIG. 4B depicts an aerial vehicle at various points in time as indicated on a timeline 409, according to method 400. In this example, the aerial vehicle may be the balloon 100 from FIG. 1. It should be understood that this is for purposes of example and explanation only, and it should not be construed as limiting. Various other aerial vehicles may implement method 400.

As shown, the balloon 100 may be floating in the atmosphere and, at time $T_0$, the balloon 100 may begin to descend toward the ground 410. At time $T_1$, which may be at any time during the descent, the balloon 100 may determine a transmission trigger for a location-report message. In one example, time $T_1$ may be at 12:00:00Z and the transmission trigger may be determined to be a transmission time at 12:04:45Z. That is, the aerial vehicle may determine that an expected location-report message transmission at 12:04:45Z may have at least, for example, a 95% probability of occurring before the balloon 100 contacts the ground 410. In another example, the transmission trigger may be determined to be a transmission altitude 420 of, for example, 1.3 meters above sea level.

3. Transmitting Location-Report Message

Returning to FIG. 4A, at block 406, the method 400 may involve, responsive to the transmission trigger, transmitting the location-report message, where the location-report message includes location data from the aerial vehicle. As discussed above, the location data may indicate GPS and/or barometric altitude data.

In one embodiment, where the transmission trigger includes a transmission time, transmitting the location-report message may involve determining that the transmission time elapsed or otherwise occurred. In another embodiment, where the transmission trigger includes a transmission altitude, transmitting the location-report message may involve determining that the aerial vehicle is at the transmission altitude.

In some embodiments, the aerial vehicle may transmit the location-report message to a ground station. In other embodiments, the aerial vehicle may transmit the location-report message to a second aerial vehicle. Other possibilities also exist.

Referring back to FIG. 4B, while the balloon 100 is descending, the transmission trigger may occur at some time $T_2$ and cause the balloon 100 to attempt to transmit a location-report message. For example, time $T_2$ may correspond to the transmission time, e.g., 12:04:45Z, which was determined at time $T_1$.

In another example, at time $T_2$, the balloon 100 may detect that it is at the transmission altitude 420, e.g., 1.3 meters above sea level. Correspondingly, the balloon 100 may attempt to transmit a location-report message that may include location data of the balloon 100.

b. Example Method 500

FIG. 5A illustrates a method 500 for determining communication timing of an aerial vehicle, such as the high-altitude balloon 100. The method 500 may begin at block 502 with determining a trajectory of an aerial vehicle. At block 504, the method 500 may involve, based on the trajectory, determining a final transmission trigger for a final location-report message such that a location-report message transmission that is responsive to the final transmission trigger has at least a predefined probability of occurring before the aerial vehicle contacts the ground. At block 506, the method 500 may involve, based on the final transmission trigger, determining a transmission schedule for location-report messages, where each location-report message includes location data from the aerial vehicle. At block 508, the method 500 may involve transmitting the location-report messages according to the transmission schedule. At block 510, the method 500 may involve, responsive to the final transmission trigger, transmitting the final location-report message. Each of the blocks shown with respect to FIG. 5A is discussed further below.

1. Determining a Trajectory

The example method 500 may begin at block 502 with determining a trajectory of an aerial vehicle. In one embodiment, block 502 may be the same as or similar to block 402 of FIG. 4A. That is, determining the trajectory of the aerial vehicle (e.g., balloon 100) may involve the same or similar operations as determining the trajectory of the aerial vehicle as discussed above.

2. Determining a Final Transmission Trigger

At block 504, the method 500 may involve, based on the trajectory, determining a final transmission trigger for a final location-report message such that a location-report message transmission that is responsive to the final transmission trigger has at least a predefined probability of occurring before the aerial vehicle contacts the ground. In some embodiments, block 504 may be the same as or similar to block 404 of FIG. 4A. That is, determining the final transmission trigger for the final location-report message may involve the same or similar operations as determining the transmission trigger for the location-report message as discussed above.

In one embodiment, the final transmission trigger may include a final transmission altitude that corresponds to an altitude at which the aerial vehicle may attempt to transmit the final location-report message. As such, in response to determining the final transmission trigger, the control system may store in memory final transmission altitude data that indicates an altitude where the aerial vehicle may attempt to transmit the final location-report message. In one embodiment, the final transmission altitude data may indicate GPS coordinates or a barometric altitude reading.

In other embodiments, determining the final transmission trigger for the final location-report message may involve determining a final transmission time that corresponds to a time at which the aerial vehicle may attempt to transmit the final location-report message. The final transmission time may be determined such that a location-report message transmission that is responsive to the final transmission time has at least a predefined probability of occurring before the aerial vehicle contacts the ground. In such embodiments, the aerial vehicle may attempt to transmit the final location-report message immediately before or as close as possible to landfall.

In some embodiments, the final transmission time may be determined based on given or calculable values such as $d_{interval}$, $p_{gf}(t)$, $p_{del}(d)$, and $error_{trans}(d)$. $d_{interval}$ may be defined as a time duration between location-report messages measured in seconds, e.g., the time duration between consecutive non-final location-report messages or between a non-final location-report message and the final location-report message. In some embodiments, the time duration between messages, $d_{interval}$, may be based on network limitations. For example, a communication network that may limit the frequency at which location-report messages may be transmitted, e.g., to at most one message per minute ($d_{interval}$=60 secs). $p_{gf}(t)$ may be defined as the probability that landfall occurs at time t. $p_{del}(d)$ may be defined as the probability that a message can be delivered within the duration d. $error_{trans}(d)$ may be defined as the expected landfall prediction error (in meters) if the final location-report message was successfully transmitted duration d seconds before landfall. That is, $error_{trans}(d)$ may define an expected landing area of the aerial vehicle when the final location-report message was successfully transmitted d seconds before landfall. For example, $error_{trans}(d)$ may indicate a radius of the expected landing area of the aerial vehicle or may indicate the size of the expected landing area (in meters squared).

The final transmission time may also be based on determining $error_{attempt}(d)$ from the above given or calculable values. $error_{attempt}(d)$ may be defined as the expected landfall prediction error (in meters) if the final location-report message is attempted to be transmitted at duration d seconds before landfall. That is, $error_{attempt}(d)$ may define an expected landing area of the aerial vehicle if the final location-report message is attempted to be transmitted d seconds before landfall. For example, $error_{attempt}(d)$ may indicate a radius of the expected landing area of the aerial vehicle or may indicate the size of the expected landing area (in meters squared). Generally, $error_{attempt}(d)$ may be larger (the expected landing area will increase) as time d is increased. For example, the expected landfall prediction error of an attempted transmission at 59 seconds before landfall may be larger than the expected landfall prediction error of an attempted transmission at 1 second before landfall.

Further, the final transmission time may be based on using the intermediate variable $d_{gf}$, which is defined as the duration (in seconds) between an attempted transmission of the final location-report message and landfall, in the expected landfall prediction error. $error_{attempt}(d_{gf})$ may be determined using the following equation:

$$error_{attempt}(d_{gf}) = p_{del}(d_{gf}) \cdot error_{trans}(d_{gf}) + (1 - p_{del}(d_{gf})) \cdot error_{attempt}(d_{gf} + d_{interval})$$

The above equation is a recursion that, when $p_{del}(d_{gf} + d_{interval})$ is close to 1 (e.g., when it is unlikely that two location-report messages will consecutively fail to transmit), can be approximated as:

$$\text{error}_{attempt}(d_{gf}) \approx p_{del}(d_{gf}) \cdot \text{error}_{trans}(d_{gf}) + (1 - p_{del}(d_{gf})) \cdot \text{error}_{trans}(d_{gf} + d_{interval})$$

The final transmission time may then be based on determining $t_{transmit}$ from the above approximation. $t_{transmit}$ may be defined as an optimal time (in wall-clock time (UTC)) to attempt to transmit the final location-report message. $t_{transmit}$ may be determined using the following equation:

$$t_{transmit} = \arg\min_{t} \mathop{\mathbb{E}}_{t_{gf} \sim p_{gf}} [\text{error}_{attempt}(t_{gf} - t)]$$

$$= \arg\min_{t} \int_{T} p_{gf}(t_{gf}) \cdot \text{error}_{attempt}(t_{gf} - t) \, dt_{gf}$$

The argument of the minimum may provide the transmission time t that minimizes the expected landfall prediction error. The expectation, $$\mathop{\mathbb{E}}_{t_{gf} \sim p_{gf}},$$

may mean that the actual groundfall time is sampled from a distribution of possible groundfall times. T may be defined as the set of all possible final transmission times.

The final transmission time may then be set to the determined optimal transmission time, $t_{transmit}$. As such, in response to determining the transmission trigger, the control system may store in memory final transmission time data that indicates a time when the aerial vehicle may attempt to transmit the final location-report message. In some embodiments, the final transmission time may be a wall-clock time (e.g., a Coordinated Universal Time ("UTC")) or a specified duration of time after which the final location-report message transmission may be attempted. Other examples are also possible.

3. Determining a Transmission Schedule

At block 506, the method 500 may involve, based on the final transmission trigger, determining a transmission schedule for location-report messages, where each location-report message includes location data from the aerial vehicle. Generally speaking, determining the transmission schedule may be performed in a number of ways depending on the type of the final transmission trigger. The transmission schedule may include one or more times and/or one or more altitudes that indicate when/where the aerial vehicle may attempt to transmit a location-report message (hereinafter simply referred to as "transmission attempts"). That is, the transmission schedule may include one or more transmission triggers prior to the final transmission trigger. The control system may store the transmission schedule in memory.

In some embodiments, where the final transmission trigger includes a final transmission altitude, determining the transmission schedule may involve determining a cutoff altitude that corresponds to an altitude at which the aerial vehicle ceases to attempt to transmit location-report messages. As such, the transmission schedule may include one or more altitudes where the aerial vehicle may attempt to transmit a location-report message and the cutoff altitude. Generally, the cutoff altitude may be higher than the final transmission altitude. In one embodiment, the transmission schedule may indicate transmitting location-report messages periodically or aperiodically until the aerial vehicle descends past the cutoff altitude.

In another embodiment, where the final transmission trigger includes a final transmission altitude, determining the transmission schedule may involve establishing a schedule that includes one or more intermediate altitudes that are higher than the final transmission altitude. The intermediate altitudes may indicate an altitude where a transmission attempt may occur. As such, the transmission schedule may include one or more altitudes where the aerial vehicle may attempt to transmit a location-report message.

In some embodiments, the one or more intermediate altitudes may be based on the final transmission altitude, the aerial vehicle's current altitude when the transmission schedule is being determined, and an altitude interval between transmission attempts. In one embodiment, the altitude interval may be determined such that one or more transmission attempts may occur at or below the current altitude and above the final transmission altitude. The altitude interval may be any appropriate distance measured in meters above sea level, e.g., a distance between about 1 to 100 meters above sea level.

In one example, where the aerial vehicle's current altitude is at 204 meters above sea level and the final transmission trigger is determined to be a final transmission altitude at 1 meter above sea level, the delivery schedule may include intermediate altitudes of 200, 150, 100, and 50 meters above sea level (i.e., a 50 meter altitude interval). Other examples are also possible.

In some embodiments, where the aerial vehicle may be part of a communication network with transmission restrictions, the intermediate altitudes may be based on a descent speed of the aerial vehicle and/or the trajectory. As such, the intermediate altitudes may be set at any suitable altitude and frequency such that the transmission attempts comply with the network transmission restrictions.

Figure 5B:
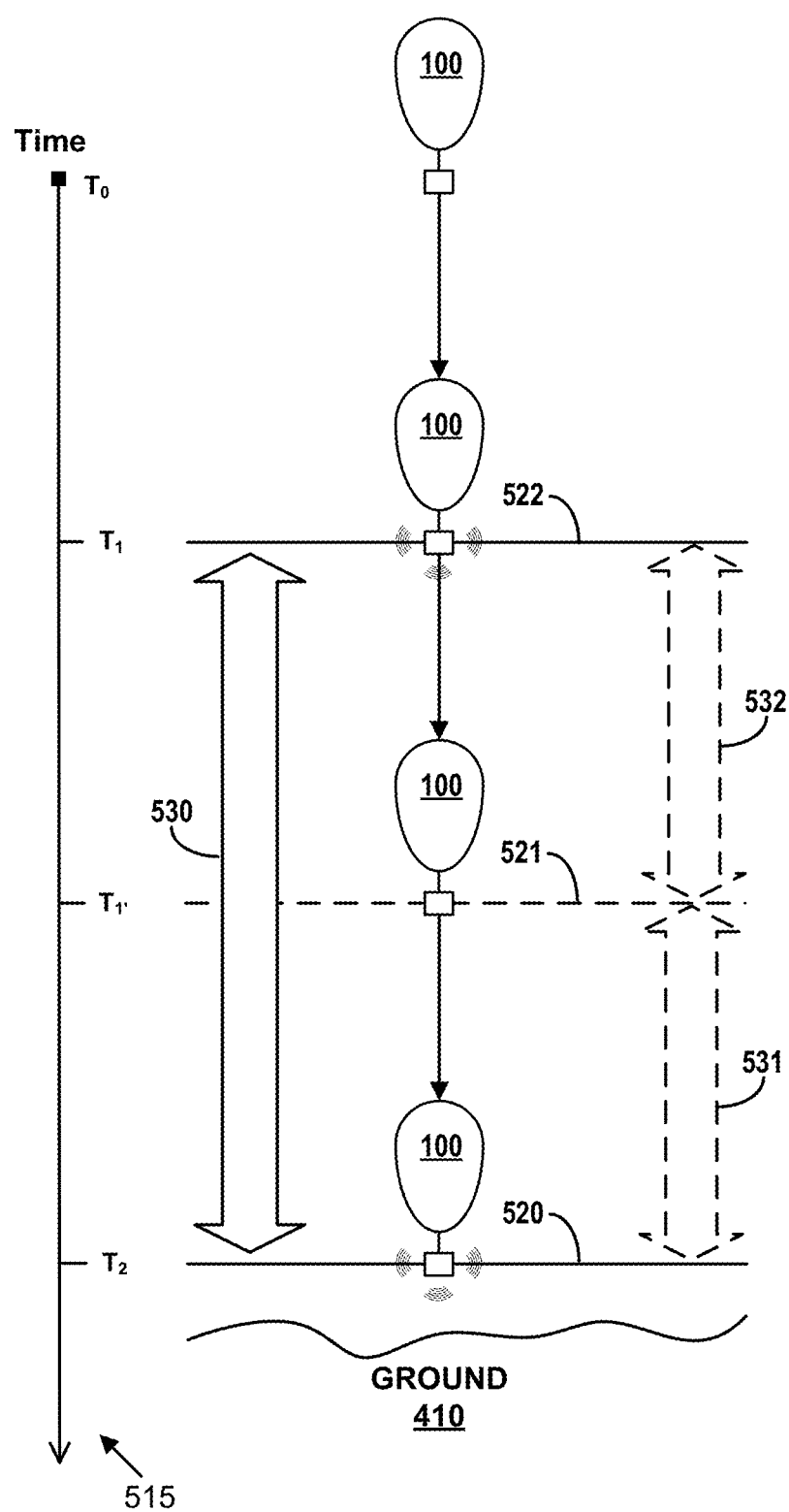
FIG. 5B illustrates an aerial vehicle at various points in time, according to an embodiment.

Referring now to FIG. 5B. FIG. 5B depicts an aerial vehicle at various points in time as indicated on a timeline 515, according to method 500. In this example, the aerial vehicle may be the balloon 100 from FIG. 1. It should be understood that this is for purposes of example and explanation only, and it should not be construed as limiting. Various other aerial vehicles may implement method 500.

As shown, the balloon 100 may be floating in the atmosphere and, at time $T_0$, the balloon 100 may begin to descend toward the ground 410. At time $T_1$, which may be at any time during the descent, the balloon 100 may determine a final transmission trigger for a final-location report message. In one example, the balloon 100 may determine the final transmission trigger to be a final transmission altitude 520, e.g., 5 meters above sea level. The balloon 100 may then determine a transmission schedule based on the final transmission altitude 520 and the current altitude 522 (e.g., 505 meters above sea level) at time $T_1$.

In some embodiments, as described above, determining the transmission schedule may involve determining a cutoff altitude. Continuing with the previous example, the balloon 100 may determine a cutoff altitude 521. In one example, the cutoff altitude 521 may be determined by computing the halfway point between the current altitude 522 and the final transmission altitude 520, e.g., 255 meters above sea level. Other examples are also possible.

In other embodiments, where the final transmission trigger includes a final transmission time, determining a transmission schedule may be based on the final transmission time and the current time at which the transmission schedule is being determined and/or a time duration between messages. In some embodiments, the time duration may be equivalent to $d_{interval}$ from block 504. As such, the transmission schedule may include one or more times at which the aerial vehicle may attempt to transmit a location-report message.

In one embodiment, determining the transmission schedule may involve working backward in time from a final transmission time to a current time and setting transmission attempts in between these two times according to a time duration. In some embodiments, where the final transmission time is set at $t_{transmit}$, as determined from block 504, the transmission schedule may indicate transmission attempts at $t_{transmit}-d_{interval}$, $t_{transmit}-2*d_{interval}$, and so on up until the current time. For example, at a current time of 09:25Z, $t_{transmit}$ may be determined to be 09:30Z. An example transmission schedule may indicate transmission attempts at times: 09:25Z, 09:26Z, 09:27Z, 09:28Z, and 09:29Z. Another example transmission schedule may indicate transmission attempts at times: 09:25Z, 09:27Z and 09:29Z. Other example transmission schedules are also possible.

In other embodiments, determining the transmission schedule may be based on a final transmission time and a time of a successful message transmission. Determining the transmission schedule may then involve determining the amount of time between the successful transmission and the final transmission time and timing transmission attempts during that determined amount of time. In some embodiments, such a determination may be further based on a communication limitation of the aerial vehicle. In one example, a successful transmission may have occurred at time 09:00Z, and the final transmission time may be determined to be at 09:04:30Z. The transmission schedule may indicate transmission attempts at times 09:01:30Z and 09:03:00Z. Other example transmission schedules are also possible.

In other embodiments, the transmission schedule may indicate transmission attempts at varying lengths of time apart depending on how close in time a transmission attempt is to the final transmission time. For example, a successful transmission may have occurred at time 09:00Z, and the final transmission time may be determined to be at 09:05:30Z. The transmission schedule may indicate transmission attempts at times: 09:01:45Z, 09:03:15Z, and 09:04:30Z. Other transmission schedules are also possible.

In some embodiments, the transmission schedule may include a transmission time and a transmission altitude for a particular transmission attempt. For example, a transmission schedule may indicate a first transmission attempt at either a first altitude or a first time, whichever occurs first. In another example, the transmission schedule may indicate a first transmission attempt at either a first altitude or a first time, whichever occurs second. Other examples are also possible.

4. Transmitting According to Transmission Schedule

At block 508, the method 500 may involve transmitting the location-report messages according to the transmission schedule. That is, as described above, each transmission attempt entry in the transmission schedule may be a transmission trigger. Upon determining that one or more of the transmission triggers have occurred, the aerial vehicle may attempt to transmit a location-report message.

In some embodiments, transmitting the location-report messages according to the transmission schedule may involve the same or similar operations as, responsive to the transmission trigger, transmitting the location-report message, as discussed above with reference to block 406 of FIG. 4A. For example, transmitting the location-report message according to the transmission schedule may involve the aerial vehicle determining that a time elapsed or a wall-clock time occurred or that the aerial vehicle is at a particular altitude.

In one embodiment, the aerial vehicle may transmit one or more of the location-report messages to a ground station. In other embodiments, the aerial vehicle may transmit one or more location-report messages to a second aerial vehicle. Other possibilities also exist.

Returning back to FIG. 5B, the balloon 100 may transmit location-report messages according to the transmission schedule as the balloon 100 descends through the altitudes represented by the arrow 530.

In another example, as also shown in FIG. 5B, where the transmission schedule includes the cutoff altitude 521, the balloon 100 may transmit location-report messages according to the transmission schedule as the balloon 100 descends through the altitudes represented by the arrow 532. At time $T_1$, the balloon 100 may detect that it is at the cutoff altitude 521 (e.g., 255 meters above sea level), and the balloon 100 may correspondingly cease transmitting location-report messages as the balloon 100 descends through the altitudes represented by the arrow 531.

5. Transmitting a Final Location-Report Message

Returning to FIG. 5A, at block 508, the method 500 may involve, responsive to the final transmission trigger, transmitting the final location-report message. In some embodiments, transmitting the final location-report message may involve the same or similar operations as, responsive to the transmission trigger, transmitting the location-report message, as discussed above with reference to block 406 of FIG. 4A For example, responsive to the final transmission trigger, transmitting the final location-report message may involve the aerial vehicle determining that the final transmission time elapsed or otherwise occurred or determining that the aerial vehicle is at the final transmission altitude.

In some embodiments, the aerial vehicle may transmit the final location-report message to a ground station. In other embodiments, the aerial vehicle may transmit the final location-report message to a second aerial vehicle. Other possibilities also exist.

Referring back to FIG. 5B, while the balloon 100 is descending, at time $T_2$, the final transmission trigger may cause the balloon 100 to attempt to transmit the final location-report message. For example, at time $T_2$, the balloon 100 may detect that it is at the final transmission altitude 520, e.g., 5 meters above sea level. Correspondingly, the balloon 100 may attempt to transmit the final location-report message that may include location data of the aerial vehicle.

It should be understood that the method 500 may be performed iteratively such that transmission of the final location-report message is attempted immediately before the aerial vehicle makes landfall (or as close as possible to landfall). In one embodiment, an iteration of the method 500 may be performed as a result of the aerial vehicle detecting a change in one or more of the factors influencing the aerial vehicle's trajectory. For example, a change in the vehicle's descent speed, the vehicle's drag coefficient (e.g., a parachute may be deployed), ambient temperature or pressure, or the vehicle's descent mode. Other examples are also possible.

In some embodiments, the method 500 may additionally involve, before transmitting the final location-report message, transitioning from a first transmission schedule to a second transmission schedule. For example, in some embodiments, determining the transmission schedule may require a computation time, for example, close to a minute long. Consequently, such a computation time may cause transitioning from a first transmission schedule to a second transmission schedule to be advantageous over not transmitting location-report messages while determining the transmission schedule. Therefore, in some embodiments, the aerial vehicle may store in memory a first transmission schedule. The first transmission schedule may be a default transmission schedule or a transmission schedule determined by a previous iteration of the method 500 as described above.

In one embodiment, transitioning from a first transmission schedule to a second transmission schedule may involve determining a second transmission schedule. The second transmission schedule may be a result of a current iteration of method 500. Transitioning from the first transmission schedule to the second transmission schedule may further involve determining a third transmission schedule from the first transmission schedule and the second transmission schedule where the third transmission schedule transitions the aerial vehicle from the first transmission schedule to the second transmission schedule.

Figure 5C:
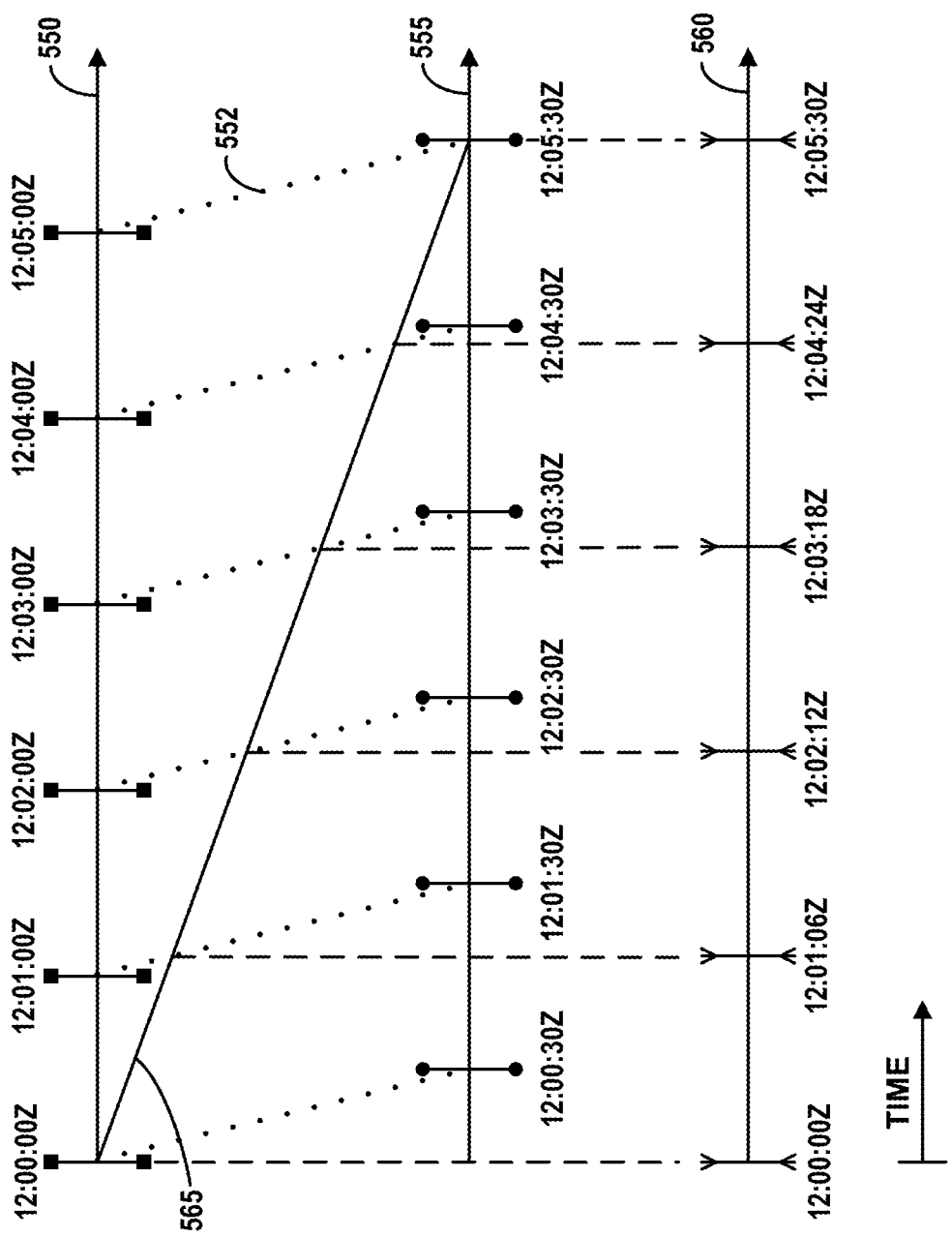
FIG. 5C illustrates an additional aspect of a method, according to an embodiment.

FIG. 5C depicts an example of transitioning an aerial vehicle from a first transmission schedule 550 to a second transmission schedule 555 using a transition transmission schedule 560. The first transmission schedule 550 may indicate a first transmission attempt time at 12:00:00Z, a second transmission attempt time at 12:01:00Z, and so forth. The second transmission schedule 555 may indicate a first transmission attempt time at 12:00:30Z, a second transmission attempt time at 12:01:00Z, and so forth. Dotted lines 552 connect corresponding attempt times for the two schedules.

Determining the transition transmission schedule 560 from the first transmission schedule 550 and the second transmission schedule 555 may involve determining transmission attempt times for the transition transmission schedule 560. Determining transmission attempt times may involve drawing a diagonal line 565 from a transmission attempt time of the first transmission schedule to the transmission attempt time of the second transmission schedule at which time the transition is to occur by. Then, the transmission attempt times for the transition transmission schedule 560 may be set to the times at which the diagonal line 565 and the dotted lines 552 intersect. For example, the transition transmission schedule 560 may be determined to have a first transmission attempt time at 12:00:00Z, a second transmission attempt time at 12:01:06Z, and so forth until the last transmission attempt time at 12:05:30Z.

Determining the transition transmission schedule 560 from the first transmission schedule 550 and the second transmission schedule 555 may depend on how sharp or gradual of a transition is desired. For example, as shown, the transition may occur in 5 message intervals. In other examples, the transition may occur in more or less message intervals, which may affect the transmission attempt times of the transition schedule and how long the aerial vehicle attempts to transmit according to the transition transmission schedule.

Once the transition transmission schedule transitions the aerial vehicle from the first transmission schedule to the second transmission schedule, the aerial vehicle may then follow the second transmission schedule. For example, after 12:05:30Z, the aerial vehicle may then follow the second transmission schedule 555.

It should be understood that the above discussion of transitioning between a first and a second transmission schedule is but one example of such a transition. Other transition examples are also possible.

V. Computing Device and Computer Program Product

Figure 6:
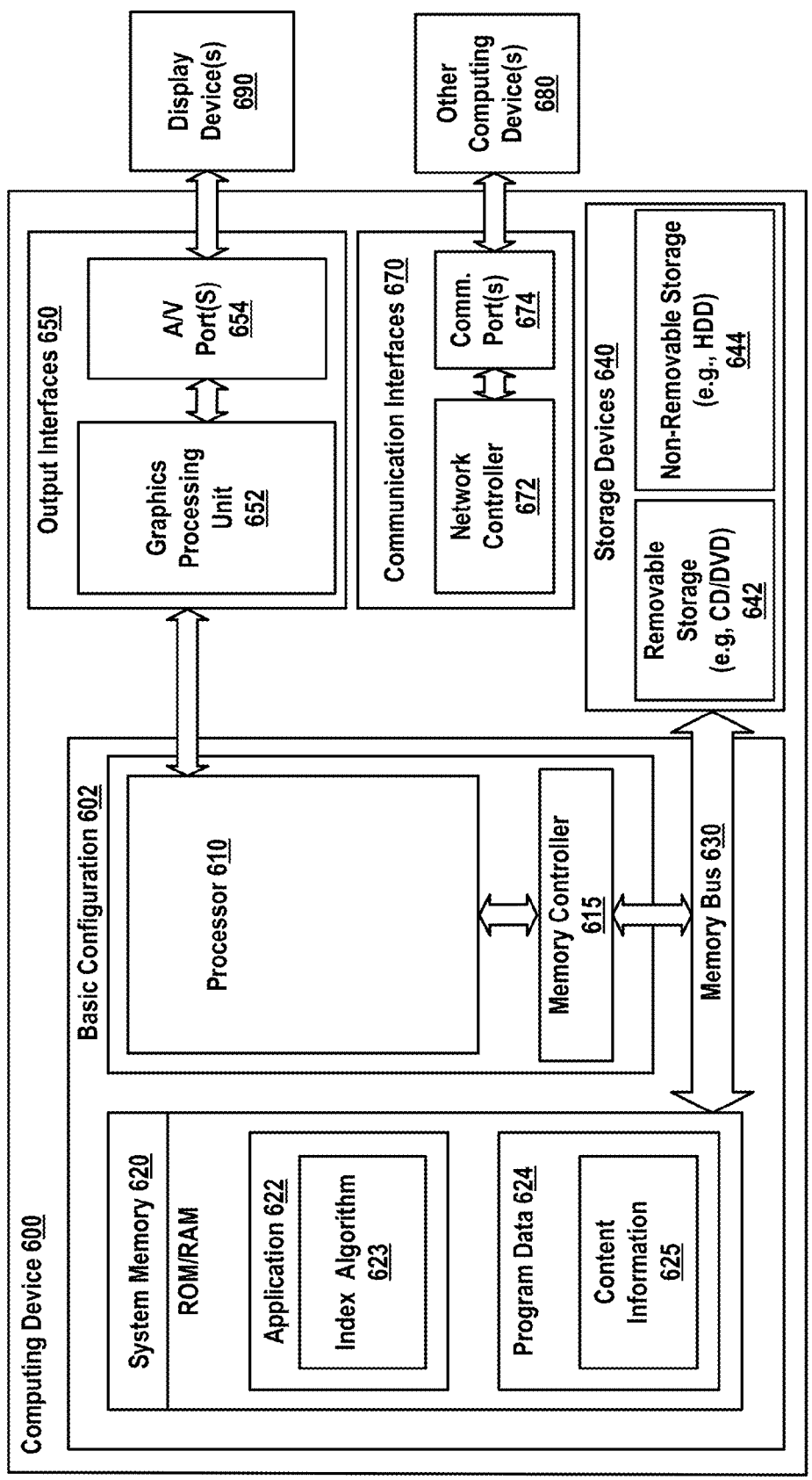
FIG. 6 illustrates a functional block diagram of a computing device, according to an embodiment.

FIG. 6 illustrates a functional block diagram of a computing device 600, according to an embodiment. The computing device 600 can be used to perform functions in connection with determining communication timing for a balloon in a balloon network. In particular, the computing device can be used to perform some or all of the functions discussed above in connection with FIGS. 1-5C.

The computing device 600 can be or include various types of devices, such as, for example, a server, personal computer, mobile device, cellular phone, custom computing device, or tablet computer. In a basic configuration 602, the computing device 600 can include one or more processors 610 and system memory 620. A memory bus 630 can be used for communicating between the processor 610 and the system memory 620. Depending on the desired configuration, the processor 610 can be of any type, including a microprocessor (μP), a microcontroller (μC), or a digital signal processor (DSP), among others. A memory controller 615 can also be used with the processor 610, or in some implementations, the memory controller 615 can be an internal part of the processor 610.

Depending on the desired configuration, the system memory 620 can be of any type, including volatile memory (such as RAM) and non-volatile memory (such as ROM, flash memory). The system memory 620 can include one or more applications 622 and program data 624. The application(s) 622 can include an index algorithm 623 that is arranged to provide inputs to the electronic circuits. The program data 624 can include content information 625 that can be directed to any number of types of data. The application 622 can be arranged to operate with the program data 624 on an operating system.

The computing device 600 can have additional features or functionality, and additional interfaces to facilitate communication between the basic configuration 602 and any devices and interfaces. For example, data storage devices 640 can be provided including removable storage devices 642, non-removable storage devices 644, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 620 and the storage devices 640 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 600.

The computing device 600 can also include output interfaces 650 that can include a graphics processing unit 652, which can be configured to communicate with various external devices, such as display devices 690 or speakers by way of one or more A/V ports or a communication interface 670. The communication interface 670 can include a network controller 672, which can be arranged to facilitate communication with one or more other computing devices 680 over a network communication by way of one or more communication ports 674. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 can also be implemented as a personal computer including both laptop computer and non-laptop computer configurations.

Figure 7:
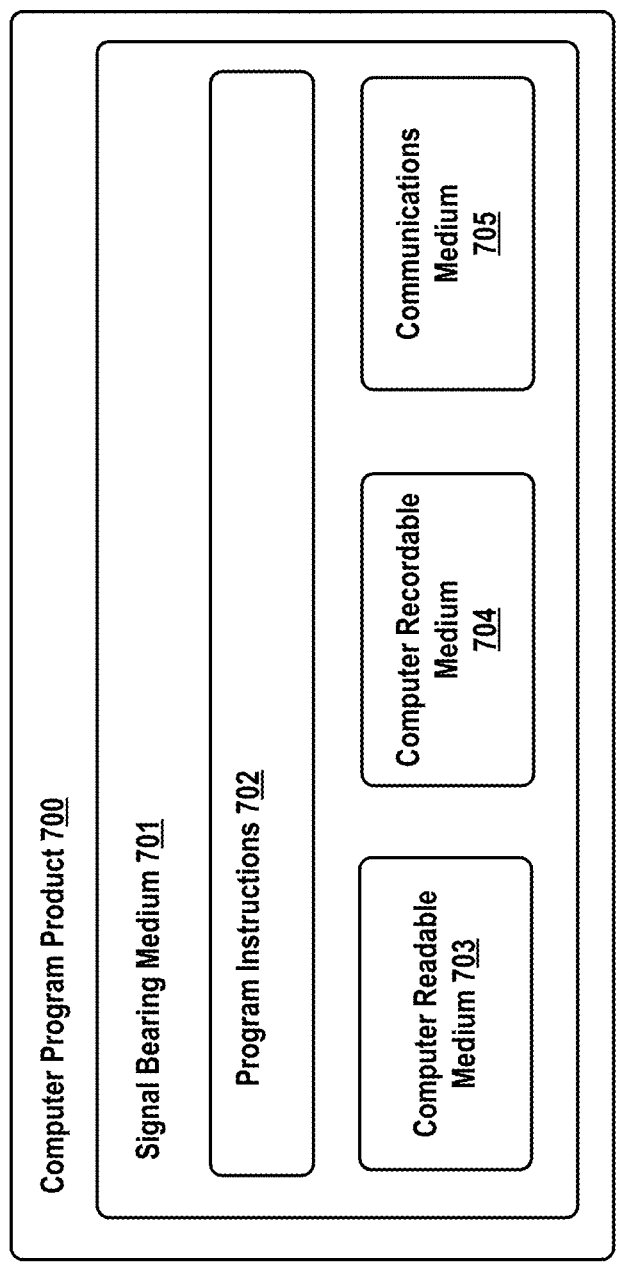
FIG. 7 illustrates a computer program product, according to an embodiment.

The disclosed methods can be implemented as computer program instructions encoded on a non-transitory computer-readable storage medium in a machine-readable format, or on other non-transitory media or articles of manufacture. FIG. 7 illustrates a computer program product 700, according to an embodiment. The computer program product 700 includes a computer program for executing a computer process on a computing device, arranged according to some disclosed implementations.

The computer program product 700 is provided using a signal bearing medium 701. The signal bearing medium 701 can include one or more programming instructions 702 that, when executed by one or more processors, can provide functionality or portions of the functionality discussed above in connection with FIGS. 1-5C. In some implementations, the signal bearing medium 701 can encompass a computer-readable medium 703 such as, but not limited to, a hard disk drive, a CD, a DVD, a digital tape, or memory. In some implementations, the signal bearing medium 701 can encompass a computer-recordable medium 704 such as, but not limited to, memory, read/write (R/W) CDs, or R/W DVDs. In some implementations, the signal bearing medium 701 can encompass a communications medium 705 such as, but not limited to, a digital or analog communication medium (for example, a fiber optic cable, a waveguide, a wired communications link, or a wireless communication link). Thus, for example, the signal bearing medium 701 can be conveyed by a wireless form of the communications medium 705 (for example, a wireless communications medium conforming with the IEEE 802.11 standard or other transmission protocol).

The one or more programming instructions 702 can be, for example, computer executable instructions. A computing device (such as the computing device 600 of FIG. 6) can be configured to provide various operations in response to the programming instructions 702 conveyed to the computing device by one or more of the computer-readable medium 703, the computer recordable medium 704, and the communications medium 705.

While various examples have been disclosed, other examples will be apparent to those skilled in the art. The disclosed examples are for purposes of illustration and are not intended to be limiting, with the true scope and spirit being indicated by the following claims.

What is claimed is:

1. A method comprising:
   determining a trajectory of an aerial vehicle;
   based on the trajectory, determining a transmission trigger for a location-report message such that a location-report message transmission that is responsive to the transmission trigger has at least a predefined probability of occurring before the aerial vehicle contacts the ground; and
   responsive to the transmission trigger, transmitting the location-report message, wherein the location-report message comprises location data from the aerial vehicle.

2. The method of claim 1, wherein determining the trajectory comprises determining at least one of an altitude, a descent speed, a drag coefficient of the aerial vehicle, an air temperature, an air pressure, and a descent mode of the aerial vehicle.

3. The method of claim 1, wherein the transmission trigger comprises a transmission time that corresponds to a time at which the aerial vehicle attempts to transmit the location-report message.

4. The method of claim 3, wherein transmitting the location-report message comprises determining that the transmission time elapsed.

5. The method of claim 1, wherein the transmission trigger comprises a transmission altitude that corresponds to an altitude at which the aerial vehicle attempts to transmit the location-report message.

6. The method of claim 5, wherein transmitting the location-report message comprises determining that the aerial vehicle is at the transmission altitude.

7. The method of claim 1, wherein the location report indicates at least one of GPS coordinates and barometric altitude data.

8. The method of claim 1, wherein the predefined probability is a probability between about 85% and 100%.

9. An aerial vehicle comprising:
   a sensor; and
   a control system configured to:
      determine a trajectory of the aerial vehicle;
      based on the trajectory, determine a transmission trigger for a location-report message such that a location-report message transmission that is responsive to the transmission trigger has at least a predefined probability of occurring before the aerial vehicle contacts the ground; and
      responsive to the transmission trigger, transmit the location-report message, wherein the location-report message comprises location data from the aerial vehicle.

10. The aerial vehicle of claim 9, wherein the sensor is configured to detect a GPS location, and wherein the location data indicates GPS coordinates.

11. The aerial vehicle of claim 9, wherein the sensor is configured to detect a barometric altitude, and wherein the location data indicates barometric altitude data.

12. A method comprising:
   determining a trajectory of an aerial vehicle;
   based on the trajectory, determining a final transmission trigger for a final location-report message such that a location-report message transmission that is responsive to the final transmission trigger has at least a predefined probability of occurring before the aerial vehicle contacts the ground;
   based on the final transmission trigger, determining a transmission schedule for location-report messages, wherein each location-report message comprises location data from the aerial vehicle;
   transmitting the location-report messages according to the transmission schedule; and
   responsive to the final transmission trigger, transmitting the final location-report message.

13. The method of claim 12, wherein the transmission schedule comprises one or more transmission triggers.

14. The method of claim 13, wherein transmitting the location-report messages according to the transmission schedule comprises determining that the one or more transmission triggers occurred.

15. The method of claim 12, wherein the final transmission trigger comprises a final transmission time that corresponds to a time at which the aerial vehicle attempts to transmit the final location-report message.

16. The method of claim 15, wherein transmitting the final location-report message comprises determining that the final transmission time elapsed.

17. The method of claim 12, wherein the final transmission trigger comprises a final transmission altitude that corresponds to an altitude at which the aerial vehicle attempts to transmit the final location-report message.

18. The method of claim 17, wherein determining the transmission schedule comprises determining a cutoff altitude that corresponds to an altitude at which the aerial vehicle ceases to attempt to transmit the location-report messages, and wherein the cutoff altitude is higher than the final transmission altitude.

19. The method of claim 17, wherein transmitting the final location-report message comprises determining that the aerial vehicle is at the transmission altitude.

20. The method of claim 12, wherein the location data indicates at least one of GPS coordinates and barometric altitude data.

21. The method of claim 12, wherein the predefined probability is a probability between about 85% and 100%.

22. The method of claim 12, wherein the transmission schedule is a second transmission schedule, the method further comprising:
    before transmitting the final location-report message, transitioning from a first transmission schedule to the second transmission schedule.

23. An aerial vehicle comprising:
    a sensor; and
    a control system configured to:
        based on the trajectory, determine a final transmission trigger for a final location-report message such that a location-report message transmission that is responsive to the final transmission trigger has at least a predefined probability of occurring before the aerial vehicle contacts the ground;
        based on the final transmission trigger, determine a transmission schedule for location-report messages, wherein each location-report message comprises location data from the aerial vehicle;
        transmit the location-report messages according to the transmission schedule; and
        responsive to the final transmission trigger, transmit the final location-report message.

24. The aerial vehicle of claim 23, wherein the sensor is configured to detect a GPS location, and wherein the location data indicates GPS coordinates.

25. The aerial vehicle of claim 23, wherein the sensor is configured to detect a barometric altitude, and wherein the location data indicates barometric altitude data.

* * * * *